(12) United States Patent
Huang

(10) Patent No.: US 10,867,537 B2
(45) Date of Patent: *Dec. 15, 2020

(54) SIGNAL MEASUREMENT CIRCUIT AND MEASUREMENT METHOD THEREOF

(71) Applicant: HKC Corporation Limited, Shenzhen (CN)

(72) Inventor: Xiaoyu Huang, Shenzhen (CN)

(73) Assignee: HKC CORPORATION LIMITED, Shenzhen (CN)

(*) Notice: Subject to any disclaimer, the term of this patent is extended or adjusted under 35 U.S.C. 154(b) by 96 days.

This patent is subject to a terminal disclaimer.

(21) Appl. No.: 16/333,672

(22) PCT Filed: Nov. 21, 2018

(86) PCT No.: PCT/CN2018/116596
§ 371 (c)(1),
(2) Date: Mar. 15, 2019

(87) PCT Pub. No.: WO2020/093450
PCT Pub. Date: May 14, 2020

(65) Prior Publication Data
US 2020/0152103 A1    May 14, 2020

(30) Foreign Application Priority Data
Nov. 9, 2018 (CN) .......................... 2018 1 1331499

(51) Int. Cl.
G09G 3/00 (2006.01)
G09G 3/36 (2006.01)
G02F 1/1362 (2006.01)
G02F 1/1368 (2006.01)

(52) U.S. Cl.
CPC ........... G09G 3/006 (2013.01); G02F 1/1368 (2013.01); G02F 1/136286 (2013.01); G09G 3/3648 (2013.01)

(58) Field of Classification Search
CPC ................. G09G 3/006; G09G 3/2003; G09G 2300/0426; G09G 2300/0408; G02F 1/1368; G02F 1/136286; G02F 1/1309
See application file for complete search history.

(56) References Cited

U.S. PATENT DOCUMENTS

2015/0077681 A1* 3/2015 Li ............................ G09G 3/36
                                                                    349/47
2016/0246145 A1* 8/2016 Du ..................... G02F 1/136286
2020/0152103 A1* 5/2020 Huang ............... G02F 1/136286

* cited by examiner

*Primary Examiner* — Alvaro E Fortich
*Assistant Examiner* — Zannatul Ferdous
(74) *Attorney, Agent, or Firm* — Juan Carlos A. Marquez; Marquez IP Lawe Office, PLLC

(57) ABSTRACT

This application provides a signal measurement circuit and a measurement method thereof. The signal measurement circuit is connected to a scan line and a data line by using a shim, to measure waveform signals of the scan line and the data line.

18 Claims, 5 Drawing Sheets

SIGNAL MEASUREMENT CIRCUIT AND MEASUREMENT METHOD THEREOF

BACKGROUND

Technical Field

This application relates to the display field, and in particular, to a signal measurement circuit and a measurement method thereof.

Related Art

A liquid crystal display (LCD) is a flat-panel display apparatus displaying an image by using a feature of a liquid crystal material. Compared with another display apparatus, the LCD has advantages such as lightness and thinness, a low drive voltage, and low power consumption.

In addition, a liquid crystal displaying device usually has a gate drive circuit, a source drive circuit, and a pixel array. The pixel array has a plurality of pixel circuits. Each pixel circuit is opened and closed based on a scan signal provided by the gate drive circuit, and displays a data picture based on a data signal provided by the source drive circuit.

A thin film transistor liquid crystal display (TFT-LCD) is one of main types of current flat-panel displays, and has become an important display platform in modern information science and technology products and videoconferencing products. A main driving principle of the TFT-LCD is: A system main board connects a compression signal, a control signal, and a power supply of a red/green/blue picture element to a connector on a printed circuit board by using wires; after being processed by a timing controller (TCON) chip on the printed circuit board, data passes through the printed circuit board, and is connected to a display area by using a source-chip on film (S-COF) and a gate-chip on film (G-COF); and a voltage is transmitted by using a data line and a scan line on an array substrate, to enable a display panel to implement a display function.

There are capacitance and resistance in wiring on the array substrate, and consequently a signal is distorted after being transmitted by using the data line and the scan line. During a process of product development and subsequent parsing, a voltage signal attenuated after being transmitted by using the data line and the scan line on the array substrate often needs to be measured. In actual application, because ends of the data line and the scan line are located on an edge of glass, the measurement can be performed only after glass splintering. This method requires a relatively long time; and after the glass splintering, a product is damaged, causing wastes, and splinters cause liquid crystals to volatilize. After being inhaled into a human body, the liquid crystals are harmful to health.

Therefore, a main objective of this application is to provide a signal measurement circuit and a measurement method thereof, to implement further optimization for the problem mentioned above.

SUMMARY

To resolve the foregoing technical problem, an objective of this application is to provide a signal measurement circuit, comprising: a first switch, wherein a control end of the first switch is electrically coupled to a first test apparatus, a first end of the first switch is electrically coupled to a first node, and a second end of the first switch is electrically coupled to a second node; a second switch, wherein a control end of the second switch is electrically coupled to the first test apparatus, a first end of the second switch is electrically coupled to a third node, and a second end of the second switch is electrically coupled to the second node; and a third switch, wherein a control end of the third switch is electrically coupled to a second test apparatus, a first end of the third switch is electrically coupled to the second node, and a second end of the third switch is electrically coupled to a shim, wherein an other end of the first test apparatus is electrically coupled to a first frequency input signal; and an other end of the second test apparatus is electrically coupled to a second frequency input signal.

Another objective of this application is to provide a signal measurement circuit, comprising: a first switch, wherein a control end of the first switch is electrically coupled to a first test apparatus, a first end of the first switch is electrically coupled to a first node, and a second end of the first switch is electrically coupled to a second node; a second switch, wherein a control end of the second switch is electrically coupled to the first test apparatus, a first end of the second switch is electrically coupled to a third node, and a second end of the second switch is electrically coupled to the second node; a third switch, wherein a control end of the third switch is electrically coupled to a second test apparatus, a first end of the third switch is electrically coupled to the second node, and a second end of the third switch is electrically coupled to a shim; a fourth switch, wherein a control end of the fourth switch is electrically coupled to the second test apparatus, a first end of the fourth switch is electrically coupled to a data line, and a second end of the fourth switch is electrically coupled to the first node; and a fifth switch, wherein a control end of the fifth switch is electrically coupled to the second test apparatus, a first end of the fifth switch is electrically coupled to a scan line, and a second end of the fifth switch is electrically coupled to the third node, wherein an other end of the first test apparatus is electrically coupled to a first frequency input signal; an other end of the second test apparatus is electrically coupled to a second frequency input signal; and the first test apparatus and the second test apparatus separately have conductor portions and a nonconductor portion.

Still another objective of this application is to provide a measurement method of a signal measurement circuit, comprising: providing a first switch, wherein a control end of the first switch is electrically coupled to a first test apparatus, a first end of the first switch is electrically coupled to a first node, and a second end of the first switch is electrically coupled to a second node; providing a second switch, wherein a control end of the second switch is electrically coupled to the first test apparatus, a first end of the second switch is electrically coupled to a third node, and a second end of the second switch is electrically coupled to the second node; providing a third switch, wherein a control end of the third switch is electrically coupled to a second test apparatus, a first end of the third switch is electrically coupled to the second node, and a second end of the third switch is electrically coupled to a shim; providing a fourth switch, wherein a control end of the fourth switch is electrically coupled to the second test apparatus, a first end of the fourth switch is electrically coupled to a data line, and a second end of the fourth switch is electrically coupled to the first node; providing a fifth switch, wherein a control end of the fifth switch is electrically coupled to the second test apparatus, a first end of the fifth switch is electrically coupled to a scan line, and a second end of the fifth switch is electrically coupled to the third node; providing a first resistor, wherein one end of the first resistor is electrically coupled to the first test apparatus, and an other end of the first resistor is electrically grounded; providing a second resistor, wherein one end of the second resistor is electrically coupled to the second test apparatus, and an other end of the second resistor is electrically grounded; measuring a waveform signal of a scan line by using a connection between the shim and the scan line; and measuring a waveform signal of a data line by using a connection between the shim and the data line, wherein the first test apparatus and the second test apparatus separately have conductor portions and a nonconductor portion.

The objectives of this application and resolution of the technical problem of this application are implemented by using the following technical solutions.

In an embodiment of this application, polarities of the control ends of the first switch and the third switch are opposite to a polarity of the control end of the second switch.

In an embodiment of this application, the first switch and the third switch are N-type field-effect transistors.

In an embodiment of this application, the second switch is a P-type field-effect transistor.

In an embodiment of this application, a fourth switch is further comprised, wherein a control end of the fourth switch is electrically coupled to the second test apparatus, a first end of the fourth switch is electrically coupled to a data line, and a second end of the fourth switch is electrically coupled to the first node.

In an embodiment of this application, a fifth switch is further comprised, wherein a control end of the fifth switch is electrically coupled to the second test apparatus, a first end of the fifth switch is electrically coupled to a scan line, and a second end of the fifth switch is electrically coupled to the third node.

In an embodiment of this application, a first resistor is further comprised, wherein one end of the first resistor is electrically coupled to the first test apparatus, and an other end of the first resistor is electrically grounded.

In an embodiment of this application, a second resistor is further comprised, wherein one end of the second resistor is electrically coupled to the second test apparatus, and an other end of the second resistor is electrically grounded.

In an embodiment of this application, according to the measurement method, an other end of the first test apparatus is electrically coupled to a first frequency input signal; and an other end of the second test apparatus is electrically coupled to a second frequency input signal.

In an embodiment of this application, according to the measurement method, the step of measuring a waveform signal of a scan line by using a connection between the shim and the scan line comprises: melting the nonconductor portion of the second test apparatus by using a laser, so that a gate control signal of the third switch, the fourth switch, and the fifth switch is a high-potential signal, thereby opening the third switch, the fourth switch, and the fifth switch; closing the first switch and opening the second switch by grounding the first resistor; and measuring the waveform signal of the scan line by using the shim.

In an embodiment of this application, according to the measurement method, the step of measuring a waveform signal of a data line by using a connection between the shim and the data line comprises: melting the nonconductor portion of the first test apparatus by using a laser, so that a gate control signal of the first switch and the second switch is a high-potential signal, thereby opening the first switch and closing the second switch; and measuring the waveform signal of the data line by using the shim.

This application provides a circuit and a measurement method being capable of quickly measuring a needed signal as required, without affecting product performance and causing additional device costs, to eliminate harm to a human body during a glass splintering process.

DETAILED DESCRIPTION

The following embodiments are described with reference to the accompanying drawings, which are used to exemplify specific embodiments for implementation of this application. Terms about directions mentioned in this application, such as "on", "below", "front", "back", "left", "right", "in", "out", and "side surface" merely refer to directions in the accompanying drawings. Therefore, the used terms about directions are used to describe and understand this application, and are not intended to limit this application.

The accompanying drawings and the description are considered to be essentially exemplary, rather than limitative. In the figures, modules with similar structures are represented by using the same reference number. In addition, for understanding and ease of description, the size and the thickness of each component shown in the accompanying drawings are arbitrarily shown, but this application is not limited thereto.

In the accompanying drawings, for clarity, thicknesses of a layer, a film, a panel, an area, and the like are enlarged. In the accompanying drawings, for understanding and ease of description, thicknesses of some layers and areas are enlarged. It should be understood that when a component such as a layer, a film, an area, or a base is described to be "on" "another component", the component may be directly on the another component, or there may be an intermediate component.

In addition, throughout this specification, unless otherwise explicitly described to have an opposite meaning, the word "include" is understood as including the component, but not excluding any other component. In addition, throughout the specification, "on" means that one is located above or below a target component and does not necessarily mean that one is located on the top based on a gravity direction.

To further describe the technical measures taken in this application to achieve the intended application objective and effects thereof, specific implementations, structures, features, and effects of a signal measurement circuit and a measurement method thereof that are provided according to this application are described below in detail with reference to the drawings and preferred embodiments.

Figure 1:
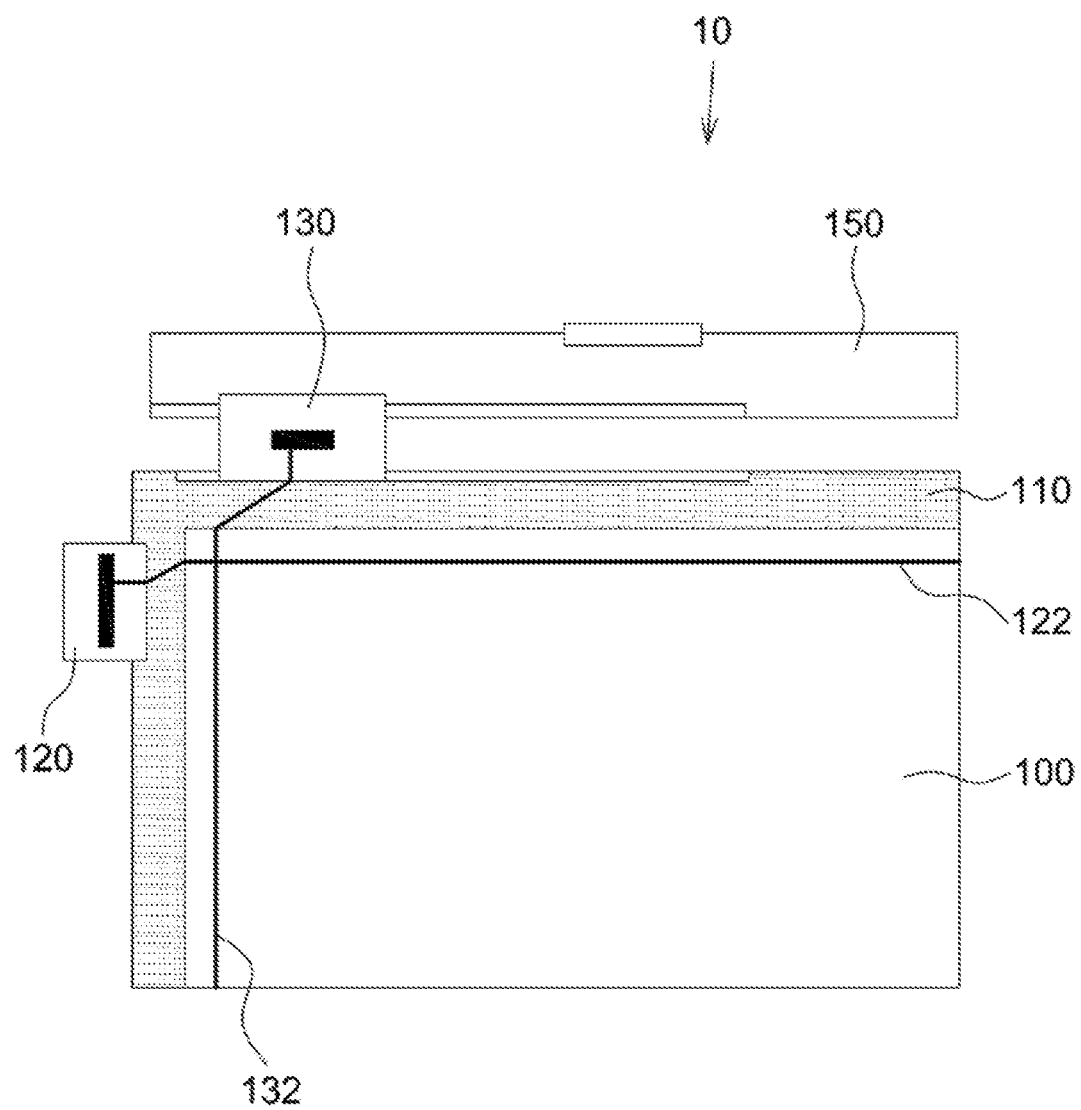
FIG. 1 is a schematic diagram of an exemplary LCD.

FIG. 1 is a schematic diagram of an exemplary LCD. Referring to FIG. 1, an exemplary LCD 10 includes a color filter substrate 100, an array substrate 110, a G-COF 120, an S-COF 130, and a printed circuit board 150. A plurality of scan lines 122 and a plurality of data lines 132 are arranged on the array substrate 110. The scan lines 122 are electrically coupled to the G-COF 120. The data lines 132 are electrically coupled to the S-COF 130.

Figure 2:
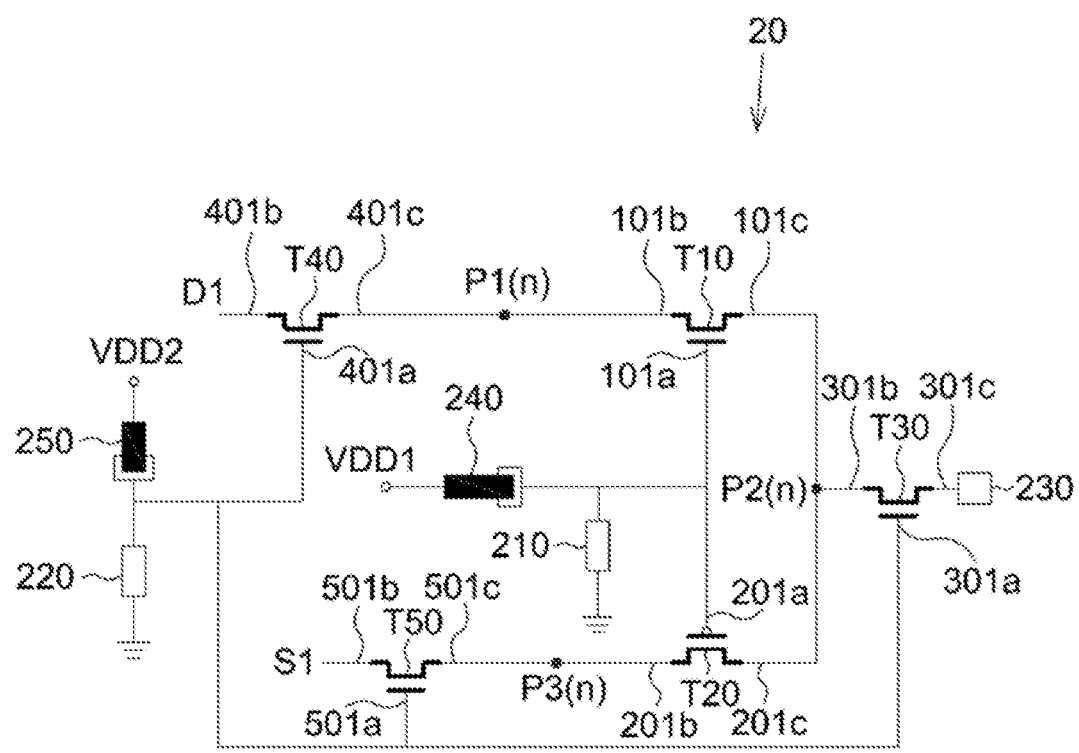
FIG. 2 is a schematic diagram of a signal measurement circuit according to an embodiment of this application.
Figure 3A:
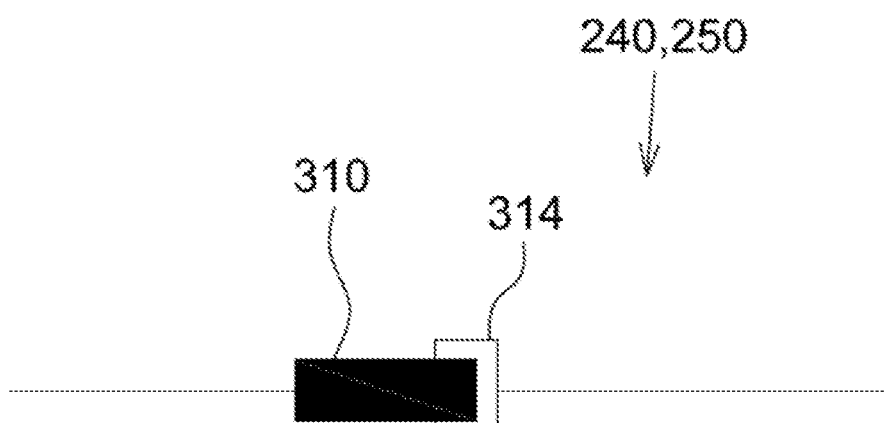
FIG. 3a is a structural bottom view of a test apparatus in a signal measurement circuit according to an embodiment of this application.
Figure 3B:
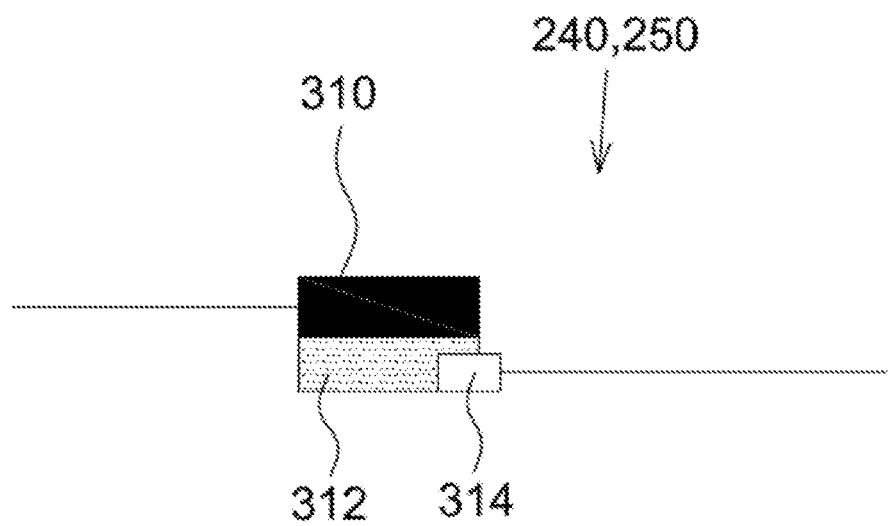
FIG. 3b is a structural side view of a test apparatus in a signal measurement circuit according to an embodiment of this application.

FIG. 2 is a schematic diagram of a signal measurement circuit according to an embodiment of this application. FIG. 3*a* is a structural bottom view of a test apparatus in a signal measurement circuit according to an embodiment of this application. FIG. 3*b* is a structural side view of a test apparatus in a signal measurement circuit according to an embodiment of this application. Referring to FIG. 2, in an embodiment of this application, a signal measurement circuit 20 includes: a first switch T10, where a control end 101*a* of the first switch T10 is electrically coupled to a first test apparatus 240, a first end 101*b* of the first switch T10 is electrically coupled to a first node P1(*n*), and a second end 101*c* of the first switch T10 is electrically coupled to a second node P2(*n*); a second switch T20, where a control end 201*a* of the second switch T20 is electrically coupled to the first test apparatus 240, a first end 201*b* of the second switch T20 is electrically coupled to a third node P3(*n*), and a second end 201*c* of the second switch T20 is electrically coupled to the second node P2(*n*); and a third switch T30, where a control end 301*a* of the third switch T30 is electrically coupled to a second test apparatus 250, a first end 301*b* of the third switch T30 is electrically coupled to the second node P2(*n*), and a second end 301*c* of the third switch T30 is electrically coupled to a shim 230, where an other end of the first test apparatus 240 is electrically coupled to a first frequency input signal VDD1; and an other end of the second test apparatus 250 is electrically coupled to a second frequency input signal VDD2.

In an embodiment of this application, a fourth switch T40 is further included, where a control end 401*a* of the fourth switch T40 is electrically coupled to the second test apparatus 250, a first end 401*b* of the fourth switch T40 is electrically coupled to a data line D1, and a second end 401*c* of the fourth switch T40 is electrically coupled to the first node P1(*n*).

In an embodiment of this application, a fifth switch T50 is further included, where a control end 501*a* of the fifth switch T50 is electrically coupled to the second test apparatus 250, a first end 501*b* of the fifth switch T50 is electrically coupled to a scan line Si, and a second end 501*c* of the fifth switch T50 is electrically coupled to the third node P3(*n*).

In an embodiment of this application, a first resistor 210 is further included, where one end of the first resistor 210 is electrically coupled to the first test apparatus 240, and an other end of the first resistor 210 is electrically grounded.

In an embodiment of this application, a second resistor 220 is further included, where one end of the second resistor 220 is electrically coupled to the second test apparatus 250, and an other end of the second resistor 220 is electrically grounded.

Referring to FIG. 2, FIG. 3*a*, and FIG. 3*b*, in an embodiment of this application, a signal measurement circuit 20 includes: a first switch T10, where a control end 101*a* of the first switch T10 is electrically coupled to a first test apparatus 240, a first end 101*b* of the first switch T10 is electrically coupled to a first node P1(*n*), and a second end 101*c* of the first switch T10 is electrically coupled to a second node P2(*n*); a second switch T20, where a control end 201*a* of the second switch T20 is electrically coupled to the first test apparatus 240, a first end 201*b* of the second switch T20 is electrically coupled to a third node P3(*n*), and a second end 201*c* of the second switch T20 is electrically coupled to the second node P2(*n*); and a third switch T30, where a control end 301*a* of the third switch T30 is electrically coupled to a second test apparatus 250, a first end 301*b* of the third switch T30 is electrically coupled to the second node P2(*n*), and a second end 301*c* of the third switch T30 is electrically coupled to a shim 230; a fourth switch T40, where a control end 401*a* of the fourth switch T40 is electrically coupled to the second test apparatus 250, a first end 401*b* of the fourth switch T40 is electrically coupled to a data line D1, and a second end 401*c* of the fourth switch T40 is electrically coupled to the first node P1(*n*); and a fifth switch T50, where a control end 501*a* of the fifth switch T50 is electrically coupled to the second test apparatus 250, a first end 501*b* of the fifth switch T50 is electrically coupled to a scan line Si, and a second end 501*c* of the fifth switch T50 is electrically coupled to the third node P3(*n*), where an other end of the first test apparatus 240 is electrically coupled to a first frequency input signal VDD1; an other end of the second test apparatus 250 is electrically coupled to a second frequency input signal VDD2; and the first test apparatus 240 and the second test apparatus 250 separately have conductor portions 310 and 312 and a nonconductor portion 314.

In an embodiment of this application, the first switch T10, the third switch T30, the fourth switch T40, and the fifth switch T50 are N-type field-effect transistors; and when a gate control signal thereof is a high-potential signal, the first switch T10, the third switch T30, the fourth switch T40, and the fifth switch T50 are opened; or when a gate control signal thereof is a low-potential signal, the first switch T10, the third switch T30, the fourth switch T40, and the fifth switch T50 are closed.

In an embodiment of this application, the second switch T20 is a P-type field-effect transistor; and when a gate control signal thereof is a low-potential signal, the second switch T20 is opened; or when a gate control signal thereof is a high-potential signal, the second switch T20 is closed.

Figure 4:
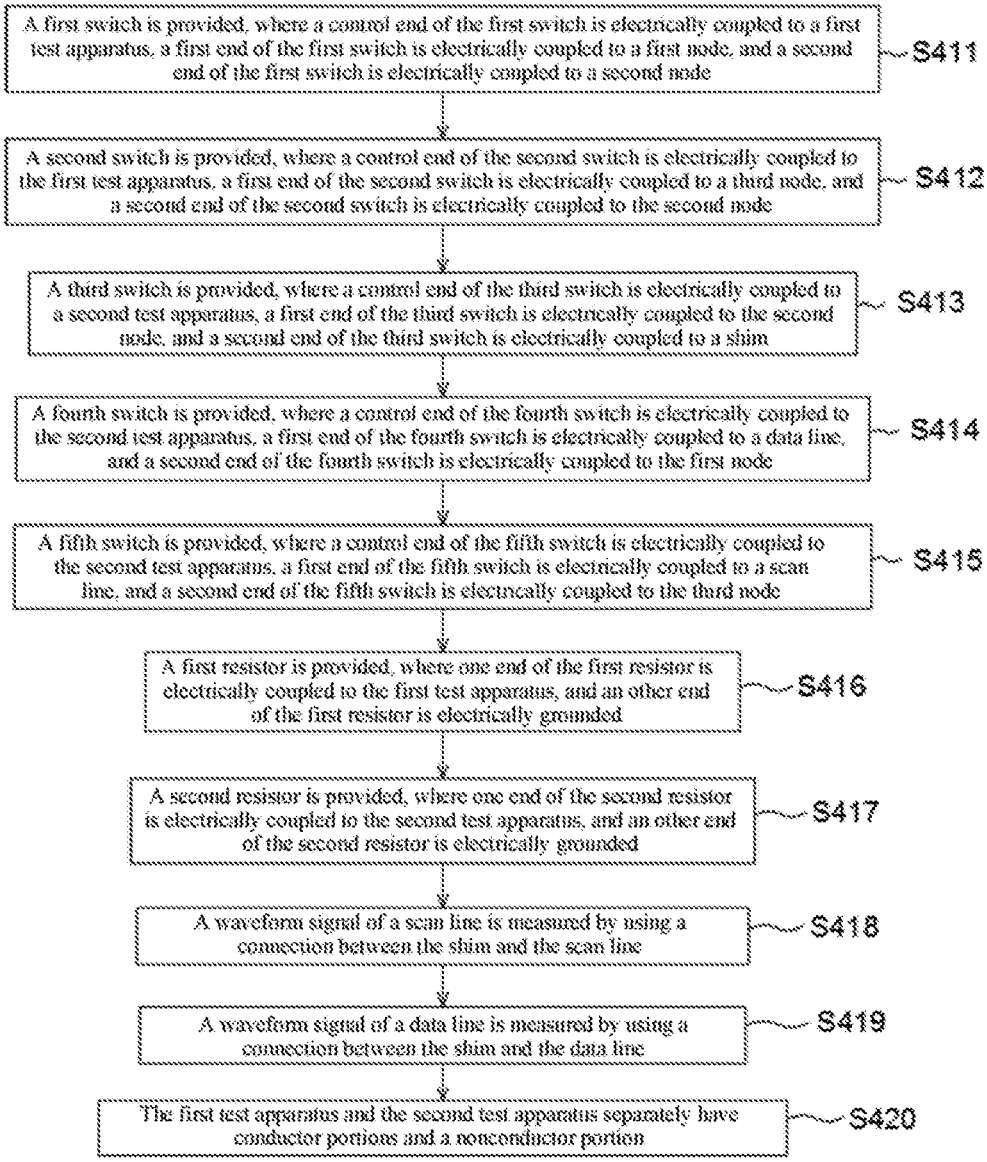
FIG. 4 is a flowchart of a measurement method of a signal measurement circuit according to an embodiment of this application.

FIG. 4 is a flowchart of a measurement method of a signal measurement circuit according to an embodiment of this application. Referring to FIG. 2, FIG. 3*a*, FIG. 3*b*, and FIG. 4, in an embodiment of this application, a measurement method of a signal measurement circuit 20 includes: providing a first switch T10, where a control end 101*a* of the first switch T10 is electrically coupled to a first test apparatus 240, a first end 101*b* of the first switch T10 is electrically coupled to a first node P1(*n*), and a second end 101*c* of the first switch T10 is electrically coupled to a second node P2(*n*); providing a second switch T20, where a control end 201*a* of the second switch T20 is electrically coupled to the first test apparatus 240, a first end 201*b* of the second switch T20 is electrically coupled to a third node P3(*n*), and a second end 201*c* of the second switch T20 is electrically coupled to the second node P2(*n*); and providing a third switch T30, where a control end 301*a* of the third switch T30 is electrically coupled to a second test apparatus 250, a first end 301*b* of the third switch T30 is electrically coupled to the second node P2(*n*), and a second end 301*c* of the third switch T30 is electrically coupled to a shim 230; providing a fourth switch T40, where a control end 401*a* of the fourth switch T40 is electrically coupled to the second test apparatus 250, a first end 401*b* of the fourth switch T40 is electrically coupled to a data line D1, and a second end 401*c* of the fourth switch T40 is electrically coupled to the first node P1(*n*); and providing a fifth switch T50, where a control end 501*a* of the fifth switch T50 is electrically coupled to the second test apparatus 250, a first end 501*b* of the fifth switch T50 is electrically coupled to a scan line Si, and a second end 501c of the fifth switch T50 is electrically coupled to the third node P3(n); providing a first resistor 210, where one end of the first resistor 210 is electrically coupled to the first test apparatus 240, and an other end of the first resistor 210 is electrically grounded; providing a second resistor 220, where one end of the second resistor 220 is electrically coupled to the second test apparatus 250, and an other end of the second resistor 220 is electrically grounded; measuring a waveform signal of a scan line Si by using a connection between the shim 230 and the scan line Si; and measuring a waveform signal of a data line D1 by using a connection between the shim 230 and the data line D1, where the first test apparatus 240 and the second test apparatus 250 separately have conductor portions 310 and 312 and a nonconductor portion 314.

Referring to FIG. 2, FIG. 3a, and FIG. 3b, in an embodiment of this application, according to the measurement method, the step of measuring a waveform signal of a scan line Si by using a connection between the shim 230 and the scan line Si includes: melting the nonconductor portion 314 of the second test apparatus 250 by using a laser, so that a gate control signal of the third switch T30, the fourth switch T40, and the fifth switch T50 is a high-potential signal, thereby opening the third switch T30, the fourth switch T40, and the fifth switch T50; closing the first switch T10 and opening the second switch T20 by grounding the first resistor 210; and measuring the waveform signal of the scan line Si by using the shim 230.

Referring to FIG. 2, FIG. 3a, and FIG. 3b, in an embodiment of this application, according to the measurement method, the step of measuring a waveform signal of a data line D1 by using a connection between the shim 230 and the data line D1 includes: melting the nonconductor portion 314 of the first test apparatus 240 by using a laser, so that a gate control signal of the first switch T10 and the second switch T20 is a high-potential signal, thereby opening the first switch T10 and closing the second switch T20; and measuring the waveform signal of the data line D1 by using the shim 230.

Referring to FIG. 4, in a procedure S411, a first switch is provided, where a control end of the first switch is electrically coupled to a first test apparatus, a first end of the first switch is electrically coupled to a first node, and a second end of the first switch is electrically coupled to a second node.

Referring to FIG. 4, in a procedure S412, a second switch is provided, where a control end of the second switch is electrically coupled to the first test apparatus, a first end of the second switch is electrically coupled to a third node, and a second end of the second switch is electrically coupled to the second node.

Referring to FIG. 4, in a procedure S413, a third switch is provided, where a control end of the third switch is electrically coupled to a second test apparatus, a first end of the third switch is electrically coupled to the second node, and a second end of the third switch is electrically coupled to a shim.

Referring to FIG. 4, in a procedure S414, a fourth switch is provided, where a control end of the fourth switch is electrically coupled to the second test apparatus, a first end of the fourth switch is electrically coupled to a data line, and a second end of the fourth switch is electrically coupled to the first node.

Referring to FIG. 4, in a procedure S415, a fifth switch is provided, where a control end of the fifth switch is electrically coupled to the second test apparatus, a first end of the fifth switch is electrically coupled to a scan line, and a second end of the fifth switch is electrically coupled to the third node.

Referring to FIG. 4, in a procedure S416, a first resistor is provided, where one end of the first resistor is electrically coupled to the first test apparatus, and an other end of the first resistor is electrically grounded.

Referring to FIG. 4, in a procedure S417, a second resistor is provided, where one end of the second resistor is electrically coupled to the second test apparatus, and an other end of the second resistor is electrically grounded.

Referring to FIG. 4, in a procedure S418, a waveform signal of a scan line is measured by using a connection between the shim and the scan line.

Referring to FIG. 4, in a procedure S419, a waveform signal of a data line is measured by using a connection between the shim and the data line.

This application provides a circuit and a measurement method being capable of quickly measuring a needed signal as required, without affecting product performance and causing additional device costs, to eliminate harm to a human body during a glass splintering process.

The wordings such as "in some embodiments" and "in various embodiments" are repeatedly used. The wordings usually refer to different embodiments, but they may also refer to a same embodiment. The words, such as "comprise", "have", and "include", are synonyms, unless other meanings are indicated in the context thereof.

The foregoing descriptions are merely embodiments of this application, and are not intended to limit this application in any form. Although this application has been disclosed above through the preferred embodiments, the embodiments are not intended to limit this application. Any person skilled in the art can make some variations or modifications, which are equivalent changes, according to the foregoing disclosed technical content to obtain equivalent embodiments without departing from the scope of the technical solutions of this application. Any simple amendment, equivalent change, or modification made to the foregoing embodiments according to the technical essence of this application without departing from the content of the technical solutions of this application shall fall within the scope of the technical solutions of this application.

What is claimed is:

1. A signal measurement circuit, comprising:
a first switch, wherein a control end of the first switch is electrically coupled to a first test apparatus, a first end of the first switch is electrically coupled to a first node, and a second end of the first switch is electrically coupled to a second node;
a second switch, wherein a control end of the second switch is electrically coupled to the first test apparatus, a first end of the second switch is electrically coupled to a third node, and a second end of the second switch is electrically coupled to the second node; and
a third switch, wherein a control end of the third switch is electrically coupled to a second test apparatus, a first end of the third switch is electrically coupled to the second node, and a second end of the third switch is electrically coupled to a shim, wherein
an other end of the first test apparatus is electrically coupled to a first frequency input signal; and an other end of the second test apparatus is electrically coupled to a second frequency input signal.

2. The signal measurement circuit according to claim 1, wherein polarities of the control ends of the first switch and the third switch are opposite to a polarity of the control end of the second switch.

3. The signal measurement circuit according to claim 2, wherein the first switch and the third switch are N-type field-effect transistors.

4. The signal measurement circuit according to claim 3, wherein the second switch is a P-type field-effect transistor.

5. The signal measurement circuit according to claim 1, further comprising a fourth switch, wherein a control end of the fourth switch is electrically coupled to the second test apparatus, a first end of the fourth switch is electrically coupled to a data line, and a second end of the fourth switch is electrically coupled to the first node.

6. The signal measurement circuit according to claim 1, further comprising a fifth switch, wherein a control end of the fifth switch is electrically coupled to the second test apparatus, a first end of the fifth switch is electrically coupled to a scan line, and a second end of the fifth switch is electrically coupled to the third node.

7. The signal measurement circuit according to claim 1, further comprising a first resistor, wherein one end of the first resistor is electrically coupled to the first test apparatus, and an other end of the first resistor is electrically grounded.

8. The signal measurement circuit according to claim 1, further comprising a second resistor, wherein one end of the second resistor is electrically coupled to the second test apparatus, and an other end of the second resistor is electrically grounded.

9. A signal measurement circuit, comprising:
a first switch, wherein a control end of the first switch is electrically coupled to a first test apparatus, a first end of the first switch is electrically coupled to a first node, and a second end of the first switch is electrically coupled to a second node;
a second switch, wherein a control end of the second switch is electrically coupled to the first test apparatus, a first end of the second switch is electrically coupled to a third node, and a second end of the second switch is electrically coupled to the second node;
a third switch, wherein a control end of the third switch is electrically coupled to a second test apparatus, a first end of the third switch is electrically coupled to the second node, and a second end of the third switch is electrically coupled to a shim;
a fourth switch, wherein a control end of the fourth switch is electrically coupled to the second test apparatus, a first end of the fourth switch is electrically coupled to a data line, and a second end of the fourth switch is electrically coupled to the first node; and
a fifth switch, wherein a control end of the fifth switch is electrically coupled to the second test apparatus, a first end of the fifth switch is electrically coupled to a scan line, and a second end of the fifth switch is electrically coupled to the third node, wherein
an other end of the first test apparatus is electrically coupled to a first frequency input signal; an other end of the second test apparatus is electrically coupled to a second frequency input signal; and the first test apparatus and the second test apparatus separately have conductor portions and a nonconductor portion.

10. The signal measurement circuit according to claim 9, wherein polarities of the control ends of the first switch, the third switch, the fourth switch, and the fifth switch are opposite to a polarity of the control end of the second switch.

11. The signal measurement circuit according to claim 10, wherein the first switch, the third switch, the fourth switch, and the fifth switch are N-type field-effect transistors.

12. The signal measurement circuit according to claim 11, wherein the second switch is a P-type field-effect transistor.

13. The signal measurement circuit according to claim 9, further comprising a first resistor, wherein one end of the first resistor is electrically coupled to the first test apparatus, and an other end of the first resistor is electrically grounded.

14. The signal measurement circuit according to claim 9, further comprising a second resistor, wherein one end of the second resistor is electrically coupled to the second test apparatus, and an other end of the second resistor is electrically grounded.

15. A measurement method of a signal measurement circuit, comprising steps of:
providing a first switch, wherein a control end of the first switch is electrically coupled to a first test apparatus, a first end of the first switch is electrically coupled to a first node, and a second end of the first switch is electrically coupled to a second node;
providing a second switch, wherein a control end of the second switch is electrically coupled to the first test apparatus, a first end of the second switch is electrically coupled to a third node, and a second end of the second switch is electrically coupled to the second node;
providing a third switch, wherein a control end of the third switch is electrically coupled to a second test apparatus, a first end of the third switch is electrically coupled to the second node, and a second end of the third switch is electrically coupled to a shim;
providing a fourth switch, wherein a control end of the fourth switch is electrically coupled to the second test apparatus, a first end of the fourth switch is electrically coupled to a data line, and a second end of the fourth switch is electrically coupled to the first node;
providing a fifth switch, wherein a control end of the fifth switch is electrically coupled to the second test apparatus, a first end of the fifth switch is electrically coupled to a scan line, and a second end of the fifth switch is electrically coupled to the third node;
providing a first resistor, wherein one end of the first resistor is electrically coupled to the first test apparatus, and an other end of the first resistor is electrically grounded;
providing a second resistor, wherein one end of the second resistor is electrically coupled to the second test apparatus, and an other end of the second resistor is electrically grounded;
measuring a waveform signal of a scan line by using a connection between the shim and the scan line; and
measuring a waveform signal of a data line by using a connection between the shim and the data line, wherein the first test apparatus and the second test apparatus separately have conductor portions and a nonconductor portion.

16. The measurement method of a signal measurement circuit according to claim 15, wherein an other end of the first test apparatus is electrically coupled to a first frequency input signal; and an other end of the second test apparatus is electrically coupled to a second frequency input signal.

17. The measurement method of a signal measurement circuit according to claim 15, wherein the step of measuring the waveform signal of the scan line by using the connection between the shim and the scan line comprises:
melting the nonconductor portion of the second test apparatus by using a laser, so that a gate control signal of the third switch, the fourth switch, and the fifth switch is a high-potential signal, thereby opening the third switch, the fourth switch, and the fifth switch;

closing the first switch and opening the second switch by grounding the first resistor; and measuring the waveform signal of the scan line by using the shim.

18. The measurement method of a signal measurement circuit according to claim 15, wherein the step of measuring the waveform signal of the data line by using the connection between the shim and the data line comprises:

melting the nonconductor portion of the first test apparatus by using a laser, so that a gate control signal of the first switch and the second switch is a high-potential signal, thereby opening the first switch and closing the second switch; and measuring the waveform signal of the data line by using the shim.

\* \* \* \* \*